United States Patent
Masuda

(10) Patent No.: US 10,705,218 B2
(45) Date of Patent: Jul. 7, 2020

(54) OBJECT POSITION DETECTION APPARATUS

(71) Applicant: Hitachi-LG Data Storage, Inc., Tokyo (JP)

(72) Inventor: Kozo Masuda, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 403 days.

(21) Appl. No.: 15/811,882

(22) Filed: Nov. 14, 2017

(65) Prior Publication Data
US 2018/0203123 A1    Jul. 19, 2018

(30) Foreign Application Priority Data

Jan. 19, 2017    (JP) ................... 2017-007484

(51) Int. Cl.
| | |
|---|---|
| G01C 3/08 | (2006.01) |
| G01S 17/89 | (2020.01) |
| G06T 7/70 | (2017.01) |
| G06T 7/194 | (2017.01) |
| G06T 7/50 | (2017.01) |
| G06T 7/136 | (2017.01) |
| G01S 17/42 | (2006.01) |
| G06T 7/11 | (2017.01) |

(Continued)

(52) U.S. Cl.
CPC .............. *G01S 17/89* (2013.01); *G01S 7/493* (2013.01); *G01S 7/4972* (2013.01); *G01S 17/42* (2013.01); *G06T 7/11* (2017.01); *G06T 7/136* (2017.01); *G06T 7/194* (2017.01); *G06T 7/50* (2017.01); *G06T 7/70* (2017.01); *G06T 7/73* (2017.01); *G06T 2207/10028* (2013.01)

(58) Field of Classification Search
None
See application file for complete search history.

(56) References Cited

U.S. PATENT DOCUMENTS 7,405,692 B2 *  7/2008  McMakin ................. G01S 7/41
                                                        342/22
8,326,571 B2    12/2012 Nagase
(Continued)

FOREIGN PATENT DOCUMENTS

JP    2009-174830 A    8/2009
JP    2015175633 A *   10/2015

*Primary Examiner* — Isam A Alsomiri
*Assistant Examiner* — Amir J Askarian
(74) *Attorney, Agent, or Firm* — Mattingly & Malur, PC

(57) ABSTRACT

An object position detection apparatus 1 includes a distance image generation unit 10 which generates a two-dimensional distance image by measuring a distance to a subject including an object on the basis of a light transmission time, an object image generation unit 16 which generates an object image in which the object is extracted from the distance image of the subject, and an installation angle detection unit 20 which detects an installation angle of the distance image generation unit 10. The object image generation unit 16 includes a differentiator 17 which performs a process of removing a background other than the object from the distance image of the subject and a threshold value d for removing the background in the differentiator 17 is set in response to the installation angle of the distance image generation unit 10 detected by the installation angle detection unit 20.

12 Claims, 10 Drawing Sheets

INPUT IMAGE (WITH PERSON)

(51) Int. Cl.
    *G01S 7/493*     (2006.01)
    *G06T 7/73*     (2017.01)
    *G01S 7/497*     (2006.01)

(56) References Cited

U.S. PATENT DOCUMENTS

| | | | |
|---|---|---|---|
| 2013/0136307 A1* | 5/2013 | Yu | H04N 7/181 |
| | | | 382/103 |
| 2013/0236089 A1* | 9/2013 | Litvak | G06K 9/00382 |
| | | | 382/154 |
| 2016/0005229 A1* | 1/2016 | Lee | G06F 3/0488 |
| | | | 345/419 |
| 2016/0253811 A1* | 9/2016 | Jang | H04N 13/261 |
| | | | 382/195 |
| 2016/0370860 A1* | 12/2016 | Bychkov | G06F 3/011 |
| 2016/0379370 A1* | 12/2016 | Nakazato | G01B 11/24 |
| | | | 382/103 |
| 2018/0106598 A1* | 4/2018 | Ushijima | G01B 11/14 |
| 2018/0113315 A1* | 4/2018 | Souchard | G02B 27/017 |
| 2019/0213786 A1* | 7/2019 | Jeong | G06K 9/00208 |

* cited by examiner

BACKGROUND IMAGE

INPUT IMAGE (WITH PERSON)

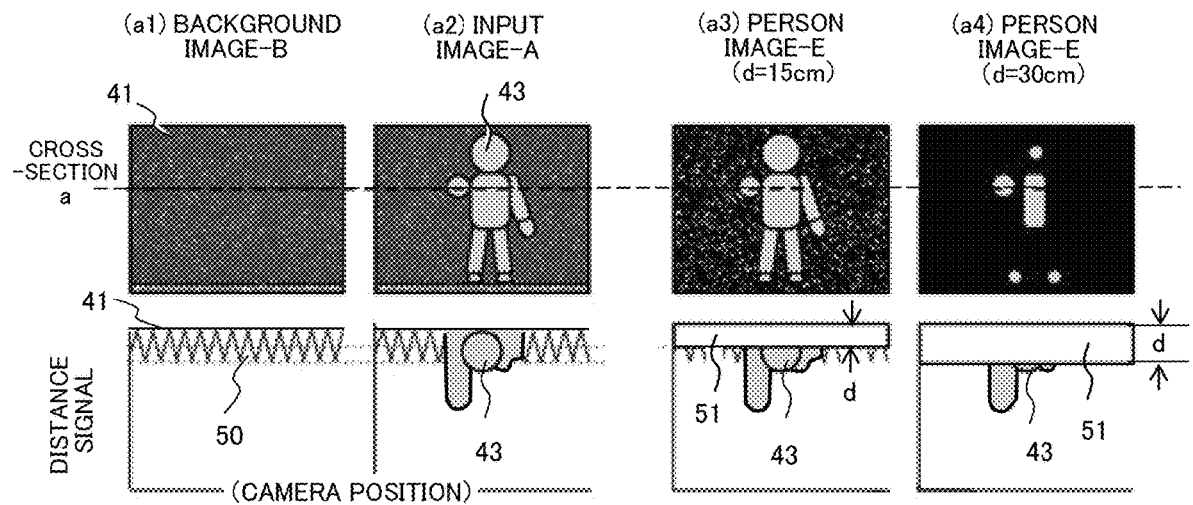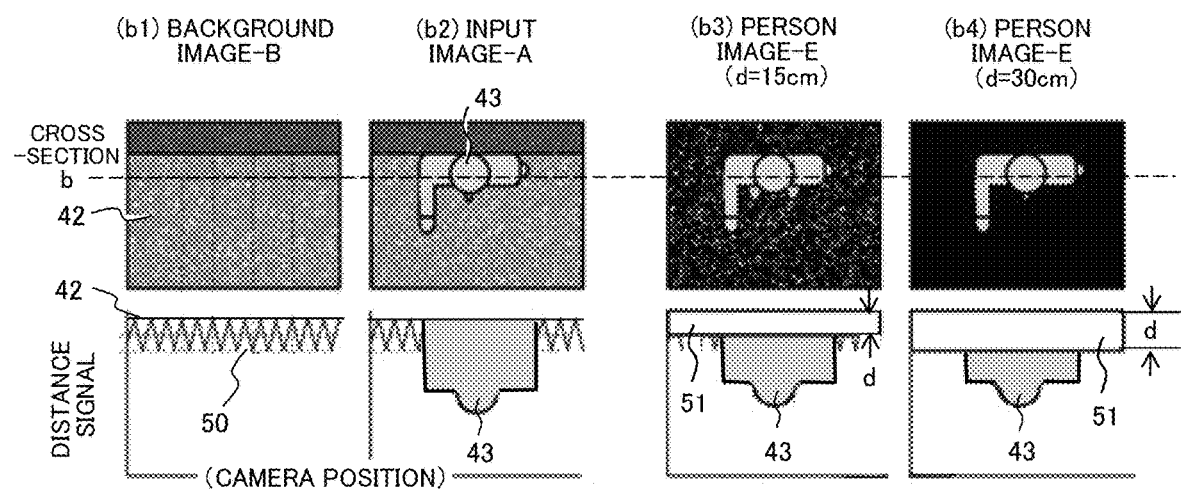

CAMERA-A (HORIZONTAL)

CAMERA-B (VERTICAL)

CAMERA-C (INCLINED)

FIG. 9

THRESHOLD VALUE TABLE (LUT)

|  | POSTURE OF PERSON | UPRIGHT STATE | | | HORIZONTAL LYING STATE |
|---|---|---|---|---|---|
|  | DISTANCE s TO PERSON | 2m OR LESS | 2m ~ 4m | 4m OR MORE | COMMON |
| INSTALLATION ANGLE $\theta$ OF CAMERA | $\theta=0°$ (HORIZONTAL) | THRESHOLD VALUE d=30cm | 20cm | 15cm | 30cm |
|  | $\theta=90°$ (VERTICAL) | 30cm | 30cm | 30cm | 15cm |
|  | $\theta=45°$ (INCLINED) | 30cm | UP:30cm DOWN:20cm | UP:30cm INTERMEDIATE :20cm DOWN:15cm | UP:30cm INTERMEDIATE :20cm DOWN:15cm |

OBJECT POSITION DETECTION APPARATUS

CLAIM OF PRIORITY

The present application claims priority from Japanese patent application serial No. JP 2017-007484, filed on Jan. 19, 2017, the content of which is hereby incorporated by reference into this application.

BACKGROUND OF THE INVENTION

(1) Field of the Invention

The present invention relates to an object position detection apparatus that outputs a position of an object such as a person as a distance image.

(2) Description of the Related Art

A technique of measuring a distance to an object on the basis of a light transmission time (hereinafter, referred to as a TOF method: Time Of Flight) and outputting a measurement result as an image (a distance image) in which a distance is displayed is known. For example, a person position detection apparatus disclosed in JP 2009-174830 A includes a distance displacement detection unit which detects a distance displacement to an object in an indoor space on the basis of distance information from a TOF-type distance image sensor and a person determination unit which determines whether a current object is a person by specifying a shape of a detected distance displacement region. Accordingly, a direction and a distance to the distance displacement region of which a shape is specified as the person are detected as a person position.

SUMMARY OF THE INVENTION

In the technique disclosed in JP 2009-174830 A, it is determined whether a current object is a person by measuring a distance to the object in the indoor space, detecting the distance displacement region from a change in time of a measurement value, and comparing a feature of a predetermined person shape with a feature of the detected distance displacement region.

In such a process, a threshold value for determining the distance displacement region is necessary, and when the threshold value is set to be small, a lot of shot noise is output in accordance with the distance displacement region. Accordingly, there is a possibility that the shot noise is erroneously recognized as the distance displacement region. In contrast, when the threshold value is set to be large, there is a concern that a part or the entirety of the object shape disappears. A method of setting an optimal threshold value by a user while seeing an obtained distance image can be considered, but since a burden of the user increases in a moving object, this method is not practical. A method of setting the threshold value is not considered in JP 2009-174830 A.

An object of the invention is to provide an object position detection apparatus capable of optimally removing shot noise included in a distance image obtained according to a TOF method.

According to an aspect of the invention, provided is an object position detection apparatus which outputs a position of an object as a distance image, including: a distance image generation unit which generates a two-dimensional distance image by measuring a distance to a subject including the object on the basis of a light transmission time; an object image generation unit which generates an object image in which the object is extracted from the distance image of the subject; and an installation angle detection unit which detects an installation angle of the distance image generation unit or an object distance/posture detection unit which detects a distance to the object or a posture of the object, wherein the object image generation unit includes a differentiator performing a process of removing a background other than the object from the distance image of the subject, and wherein a threshold value for removing the background in the differentiator is set in response to the installation angle of the distance image generation unit detected by the installation angle detection unit or the detection result of the object distance/posture detection unit.

According to the invention, since the threshold value for removing the background included in the distance image is automatically and adaptively set, it is possible to provide a clear image with little noise even in a moving object.

BRIEF DESCRIPTION OF THE DRAWINGS

FIG. 5A is a diagram illustrating a relation between an arrangement of a TOF camera and a person image.

FIG. 5B is a diagram illustrating a relation between an arrangement of a TOF camera and a person image.

FIG. 9 is a diagram illustrating an example of a threshold value setting table.

DETAILED DESCRIPTION OF THE EMBODIMENT

Figure 1:
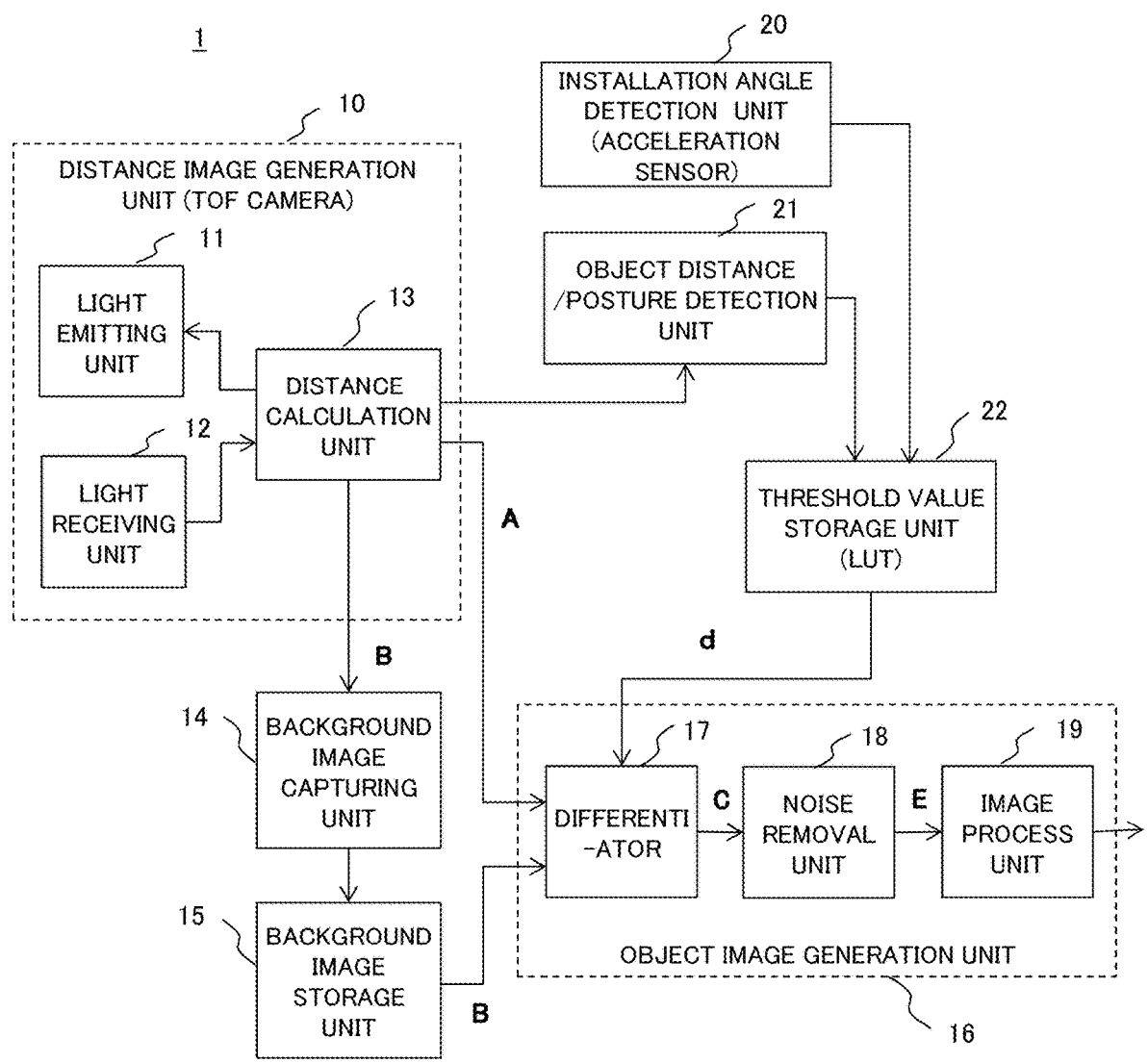
FIG. 1 is a configuration diagram illustrating an embodiment of an object position detection apparatus.

FIG. 1 is a configuration diagram illustrating an object position detection apparatus according to an embodiment of the invention. In the following example, a case in which a position of a person is detected as an object will be described. In an object position detection apparatus 1, a distance to a subject including a person is measured according to a TOF method, a distance to each part of the measured subject is displayed, for example, in color, and a measurement result is displayed as a distance image. At this time, when a background image other than the person is removed from the entire subject, a position or a posture of the person which is a detection target is easily displayed.

The object position detection apparatus 1 includes a distance image generation unit 10 (hereinafter, simply referred to as a TOF camera or a camera) which generates a distance image according to the TOF method and an object image generation unit 16 which generates an object image (a person image) by extracting a part of an object such as a person from the distance image. Further, an operation of each part is controlled by a CPU (not illustrated).

The TOF camera 10 includes a light emitting unit 11 which is a laser diode (LD) or a light emitting diode (LED) emitting pulsed light to a subject, a light receiving unit 12 which is a CCD sensor or a CMOS sensor receiving pulsed light reflected from a subject, and a distance calculation unit 13 which drives the light emitting unit 11 and calculates a distance to a subject from a detection signal of the light receiving unit 12. When a two-dimensional image of the subject is photographed by the light receiving unit 12, the distance calculation unit 13 outputs distance data of the two-dimensional image of the subject as a distance image. A distance measurement principle according to the TOF method will be described later.

A background image capturing unit 14 captures a distance image (hereinafter, referred to as a background image B) without a person from the distance calculation unit 13 and stores the distance image in the background image storage unit 15.

The object image generation unit 16 includes a differentiator 17, a noise removal unit 18, and an image process unit 19 and is used to generate an object image (a person image) from the distance image generated by the TOF camera 10 and to output the object image. When a distance image (hereinafter, referred to as an input image A) with a person is output from the distance calculation unit 13, the differentiator 17 performs a difference process between the input image A and the background image B stored in the background image storage unit 15 and outputs a difference image C. This difference process is a process of allowing the passage of the signal of the input image A in a region in which a distance difference between the input image A and the background image B is larger than a threshold value and of invalidating the signal of the input image A in a region in which the distance difference is equal to or smaller than the threshold value. Specifically, the invalidation signal is to replace distance data with infinity from the camera (or the farthest position that can be taken as distance data). In the difference image C, a background is removed from the input image A so that, for example, an object such as a person is extracted.

The noise removal unit 18 is configured as, for example, a low-pass filter and is used to further remove a residual noise included in the difference image C and to output a result as an object image E. The image process unit 19 performs a color conversion process of changing a color of the object image E of the person on the basis of the distance data and outputs a result to an external device or displays a result on a display or the like. The image process may be a process of changing brightness, contrast, and the like. By viewing the colored object image E, a user can easily know a position (distance) and a shape (posture) of an object such as a person.

In this embodiment, a threshold value d for removing the background set in the differentiator 17 is automatically and adaptively set. That is, the threshold value is optimally set from a positional relation between the TOF camera 10 and the object which is a detection target. For that reason, an installation angle detection unit 20 detects an installation angle (an inclined angle with respect to the horizontal direction) of the TOF camera 10. For example, an acceleration sensor is used in the installation angle detection unit 20. Further, an object distance/posture detection unit 21 detects a distance from the camera to the object (person) or a posture of the object by the distance data obtained from the distance calculation unit 13. The threshold value storage unit 22 stores the optimal threshold value d in a lookup table (LUT) in advance by setting the installation angle and the object position/posture as parameters. Additionally, the installation angle detection unit 20 and the object distance/posture detection unit 21 may be configured as one detection unit by integrating the functions or any one of them may be provided.

Figure 2A:
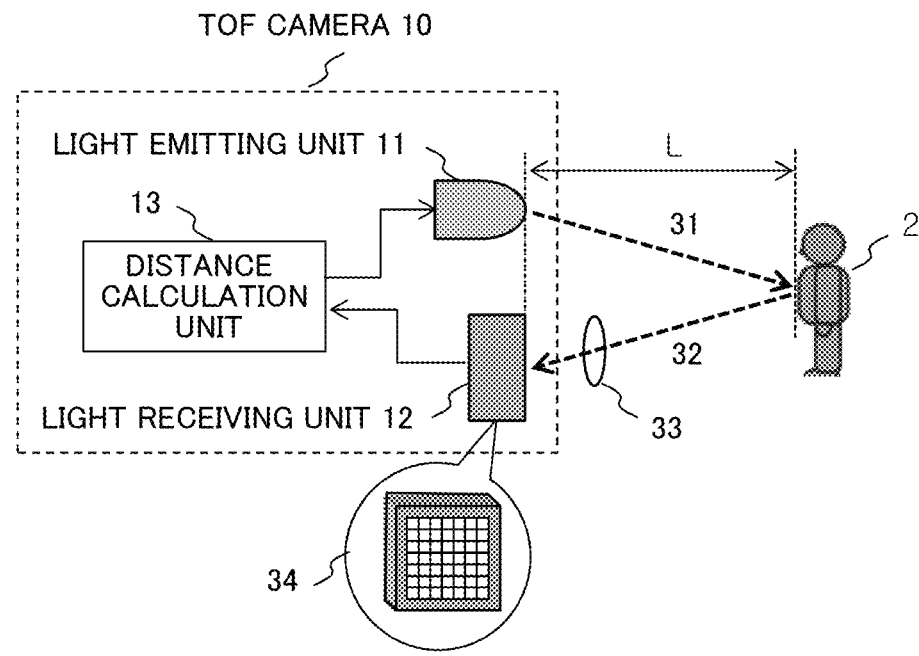
FIG. 2A is a diagram illustrating a distance measurement principle according to a TOF method.
Figure 2B:
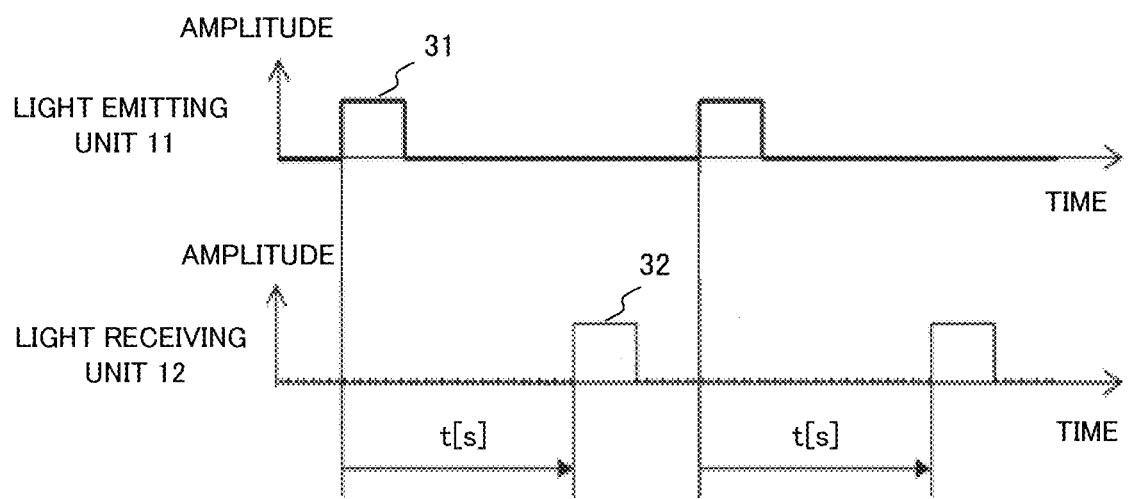
FIG. 2B is a diagram illustrating a distance measurement principle according to a TOF method.

Next, an operation of each unit will be described. FIGS. 2A and 2B are diagrams illustrating a distance measurement principle according to the TOF method. In the TOF (Time Of Flight) method, a distance is calculated by a time difference between a light emitting signal and a light receiving signal.

FIG. 2A is a diagram illustrating a relation between the TOF camera (the distance image generation unit) 10 and a subject 2 (for example, a person). The TOF camera 10 includes a light emitting unit 11 and a light receiving unit 12 and emits distance measurement light 31 from the light emitting unit 11 to the subject 2. Infrared light is used as the emitted light. The light receiving unit 12 receives reflected light 32 of the light emitted to the subject 2, and receives the light by a two-dimensional sensor 34 such as a CCD through an objective lens 33. The subject 2 exists at a position separated from the light emitting unit 11 and the light receiving unit 12 by L[m]. Here, when a time difference until the light receiving unit 12 receives the reflected light after the light emitting unit 11 emits the light is indicated by t [s] and the light flux is indicated by c [m/s], the distance L [m] to the subject 2 is obtained as below.

$$L[m] = c[m/s] \times t[s]/2 \quad (1)$$

FIG. 2B is a diagram illustrating a measurement of the time difference t. The distance calculation unit 13 calculates a distance L with respect to the subject 2 from Equation (1) by measuring the time difference t from the timing of emitting the light 31 from the light emitting unit 11 and the timing of receiving the light 32 by the light receiving unit 12. Further, it is possible to obtain a difference in distance between subject positions, that is, an unevenness shape of the subject on the basis of a difference in light receiving timing of each pixel position of the two-dimensional sensor 34.

Figure 3:
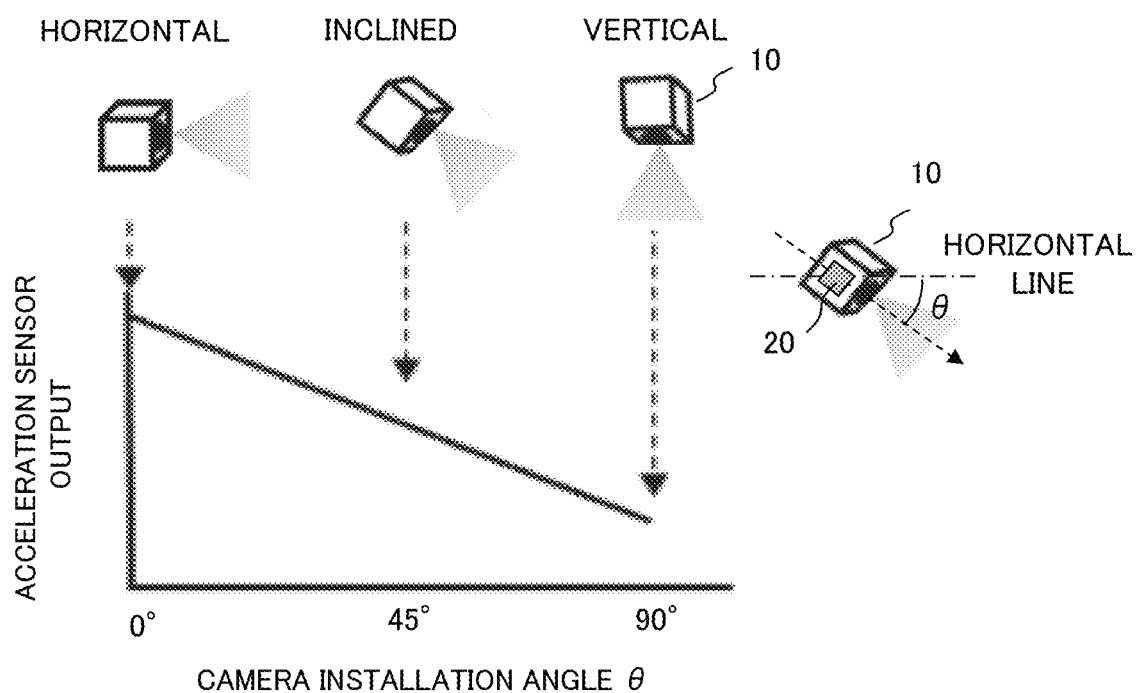
FIG. 3 is a diagram illustrating an operation of an installation angle detection unit.

FIG. 3 is a diagram illustrating an operation of the installation angle detection unit 20. The installation angle detection unit 20 is configured as, for example, an acceleration sensor and detects the installation angle θ of the TOF camera 10 from a sensor output value. If the TOF camera 10 is integrated with the object position detection apparatus 1, it means that the installation angle is the same as the installation angle of the object position detection apparatus 1. Accordingly, it is determined whether the direction of the light emitted from the TOF camera 10 is the horizontal direction (θ=0°), the vertical direction (θ=90°), or the inclined direction (θ=45°). The determined installation angle θ is used to set the threshold value d in the differentiator 17. Hereinafter, a method of generating a distance image and an object image will be described by exemplifying typical cases of a horizontal installation and a vertical installation.

Figure 4A:
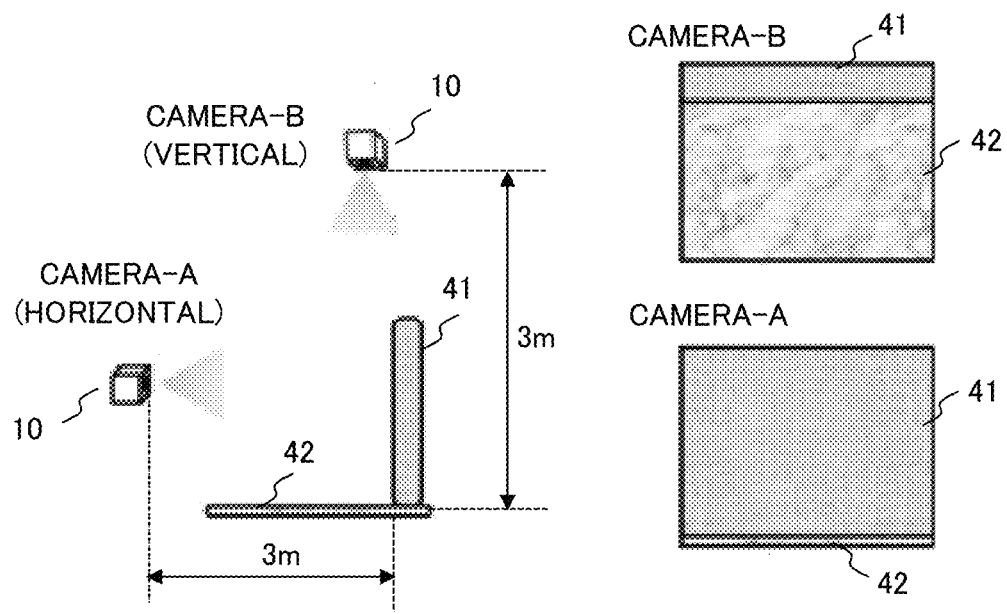
FIG. 4A is a diagram illustrating a relation between an arrangement of a TOF camera and an image of a subject.
Figure 4B:
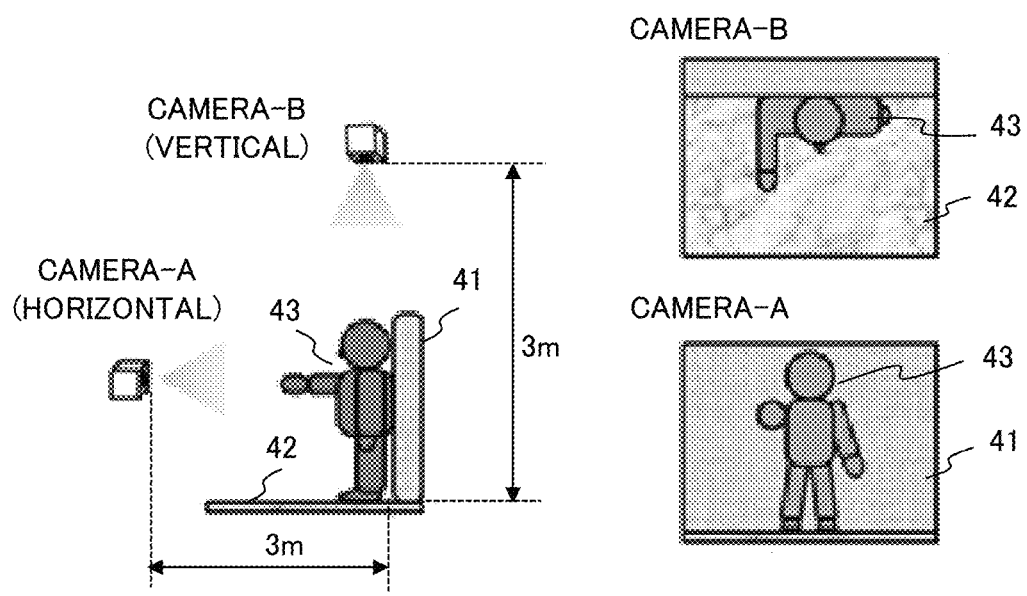
FIG. 4B is a diagram illustrating a relation between an arrangement of a TOF camera and an image of a subject.

FIGS. 4A and 4B are diagrams illustrating a relation between the arrangement of the TOF camera and the image of the subject. When the arrangement of the TOF camera 10 is the horizontal installation or the vertical installation, an example of a luminance image of the subject (the person or the background) obtained by the light receiving unit 12 of the camera is illustrated. FIG. 4A illustrates the background image without the person and FIG. 4B illustrates the input image with the person. When a space including a vertical wall surface 41 and a horizontal floor surface 42 is assumed as a background, the camera A in the horizontal installation state is disposed at a position separated from the wall surface 41 by 3 m and the camera B in the vertical installation state is disposed at a position separated from the floor surface 42 by 3 m. A person 43 stands before the wall surface 41. In this way, the background is set as the wall surface 41 and the floor surface 42 which are formed in a plane shape, but the wall surface or the floor surface may be uneven or an object such as a desk or a chair other than the person may exist. As these will be described later, these are removed by the difference process between the input image and the background image.

An image is obtained in which the person 43 and the wall surface 41 are viewed from the front side in the case of the camera A (the horizontal installation), and an image is obtained in which the person 43 and the floor surface 42 are viewed from the overhead in the case of the camera B (the vertical installation). Hereinafter, a distance image obtained with the person and the background will be described.

FIGS. 5A and 5B are diagrams illustrating a relation between the arrangement of the TOF camera and the person image. A distance image obtained in the case of the camera A (the horizontal installation) and the camera B (the vertical installation) and an object image (here, a person image) obtained by differentiating the distance image will be described. In the lower part of each image, a distance signal from the camera at a cross-sectional position indicated by a dashed line is schematically illustrated.

FIG. 5A illustrates a case of the camera A (the horizontal installation), (a1) indicates the background image B, and (a2) indicates the input image A with the person. Shot noise 50 (indicated in a zigzag shape) is superimposed on the distance signal of the lower part in addition to a signal indicating the position of the wall surface 41 or the person 43.

(a3) and (a4) indicate the person image E obtained by differentiating the background image B from the input image A. In the differentiator 17, a difference between the distance data items at the corresponding pixel positions in the images of the input image A and the background image B is calculated so that the difference image C in which the person 43 is extracted is obtained. At this step, a shape of the wall surface 41 existing in the background image B is removed. In this difference process, a region 51 having a predetermined width (the threshold value d) is set at the front side of the innermost position (in this case, the wall surface 41) of the distance signal and a signal included therein is replaced by a signal at infinity. As a result, in the difference image C, noise included in the region 51 is not visible and noise existing beyond the region 51 remains. Further, residual noise is further reduced by the noise removal unit 18 so that the person image E is obtained.

(a3) indicates a case where the background is removed when the threshold value d is 15 cm and (a4) indicates a case where the background is removed when the threshold value d is 30 cm. When the threshold value d is set to be large, the shot noise 50 is not easily recognized as in (a4), but a part of the signal of the person 43 is removed as the noise. Accordingly, in this example, it is desirable to remove the noise while the signal of the person 43 remains as in (a3). That is, it is optimal to set the threshold value d as 15 cm.

FIG. 5B illustrates a case of the camera B (the vertical installation), where (b1) indicates the background image B and (b2) indicates the input image A with the person. The shot noise 50 is superimposed on the distance signal of the lower part in addition to the signal indicating the position of the floor surface 42 or the person 43. In the input image A of (b2), since the person 43 seen from the camera is mainly the upper body and the lower body is the shade of the upper body, the image of the lower body is originally small. (b3) indicates a case where the background is removed when the threshold value d is 15 cm and (b4) indicates a case where the background is removed when the threshold value d is 30 cm. From this comparison, it is desirable to first remove the noise by setting the threshold value d to be large as in (b4). As a result, the signal of the person 43 to be deleted may be small.

In this embodiment, since the threshold value for removing the background is adaptively set in response to the current positional relation even when the positional relation among the camera, the person, and the background changes, it is possible to obtain a clear person image with little noise at all times even when the arrangement of the camera changes.

According to the above-described discussion, the threshold value for removing the background is also influenced by the position or the posture of the object (the person) other than the installation angle of the camera. Hereinafter, a detailed example of setting the threshold value will be described with reference to FIGS. 6 to 8 by adopting these factors.

Figure 6A:
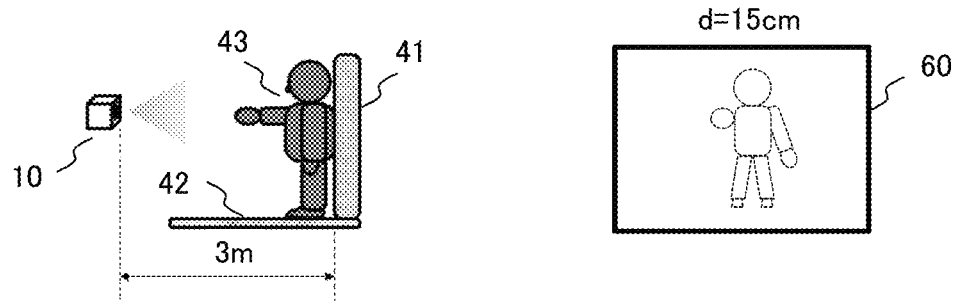
FIG. 6A is a diagram illustrating a relation between an installation angle of a TOF camera and a threshold value.
Figure 6B:
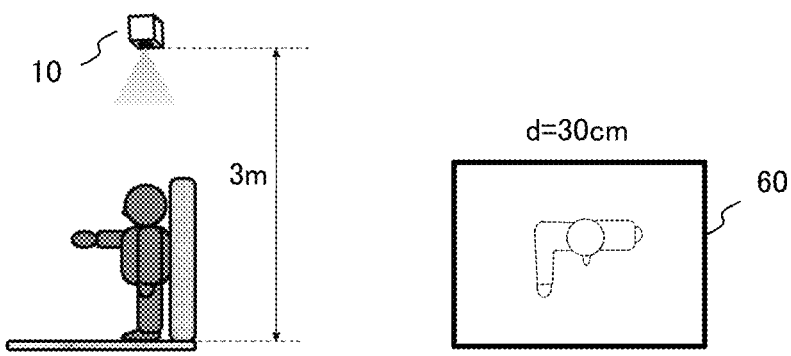
FIG. 6B is a diagram illustrating a relation between an installation angle of a TOF camera and a threshold value.
Figure 6C:
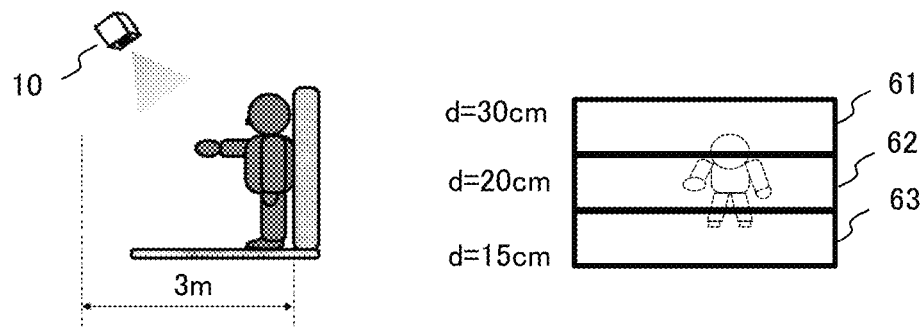
FIG. 6C is a diagram illustrating a relation between an installation angle of a TOF camera and a threshold value.

FIGS. 6A to 6C are diagrams illustrating a relation between the installation angle of the TOF camera and the threshold value. The installation angle θ is detected by the installation angle detection unit 20.

FIG. 6A illustrates a case of the camera A (the horizontal installation, θ=0°), where the threshold value for the entire screen 60 of the distance image is set to a small value (d=15 cm). This is because a distance between the camera and the person is large and a distance between the person and the background (the wall surface 41) is small.

FIG. 6B illustrates a case of the camera B (the vertical installation, θ=90°), where the threshold value for the entire screen 60 is set to a large value (d=30 cm). This is because a distance between the camera and the person is small and a distance between the person and the background (the floor surface 42) is large.

FIG. 6C illustrates a case of the camera C (the inclined installation, θ=45°), where the screen 60 is divided in the vertical direction and each region has a different threshold value. An upper region 61 of the screen has d=30 cm, a center region 62 has d=20 cm, and a lower region 63 has d=15 cm. Here, a distance between the camera and the person is different within the screen and the threshold value is set to each region. The number of dividing the screen may be appropriately set in response to the composition of the subject.

Regarding the other installation angles, the screen may be further divided so that different threshold values are set in the respective regions or the threshold value of the closest installation angle among the above-described three installation angles may be used.

Figure 7A:
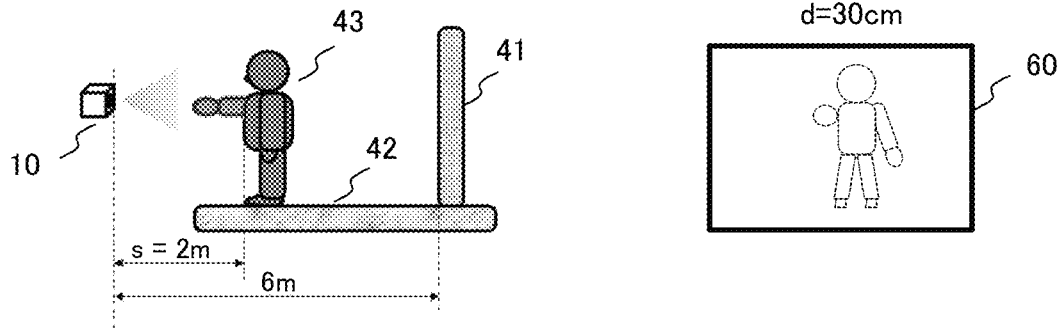
FIG. 7A is a diagram illustrating a relation between a distance to a person and a threshold value.
Figure 7B:
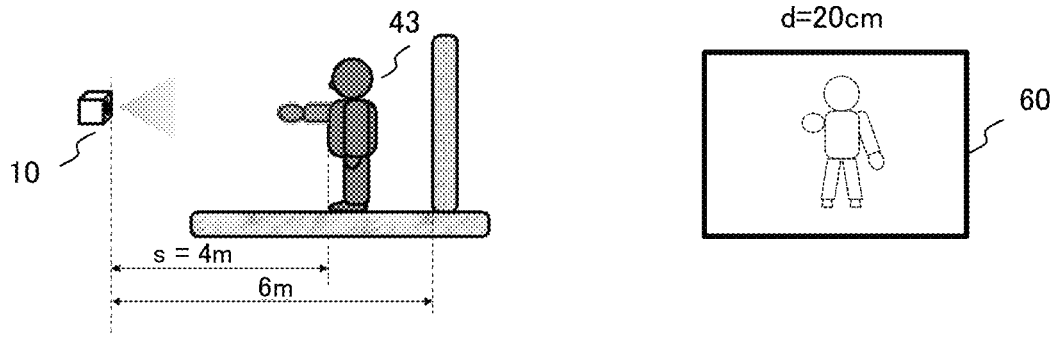
FIG. 7B is a diagram illustrating a relation between a distance to a person and a threshold value.
Figure 7C:
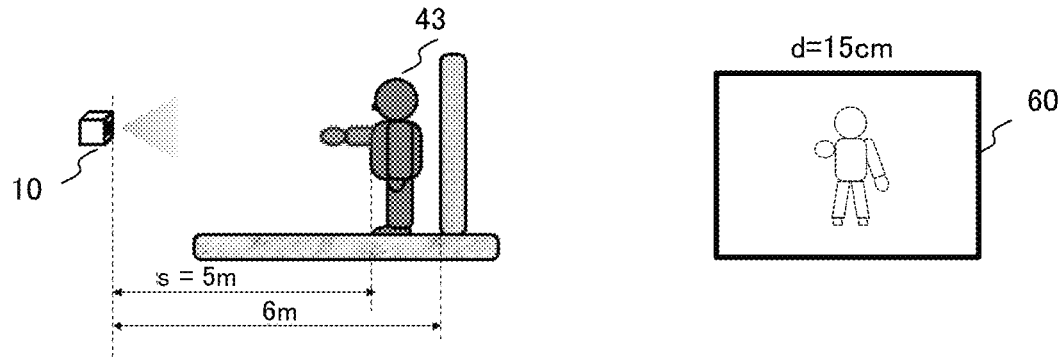
FIG. 7C is a diagram illustrating a relation between a distance to a person and a threshold value.

FIGS. 7A to 7C are diagrams illustrating a relation between a distance to the person and the threshold value. The installation angle of the TOF camera 10 is set to be horizontal (the camera A) and the distance s from the camera to the person 43 is detected by the object distance/posture detection unit 21. In this example, a distance from the camera to the wall surface 41 is set to 6 m. The object distance/posture detection unit 21 detects the distance s to the person 43 from the distance data to the object (the person) output from the distance calculation unit 13. Additionally, an image recognition process for determining the person 43 may be performed together if necessary.

FIG. 7A illustrates a case of the distance s=2 m, where the threshold value for the entire screen 60 of the distance image is set to a large value (d=30 cm). This is because a distance between the camera and the person is small and a distance between the person and the background (the wall surface 41) is large.

FIG. 7B illustrates a case of the distance s=4 m, where the threshold value for the entire screen 60 is set to an intermediate value (d=20 cm). This is because a distance between the camera and the person and a distance between the person and the background (the wall surface 41) is intermediate.

FIG. 7C illustrates a case of the distance s=6 m, where the threshold value for the entire screen 60 is set to a small value (d=15 cm). This is because a distance between the camera and the person is large and a distance between the person and the background (the wall surface 41) is small.

Here, a case in which the installation angle of the camera is horizontal has been described, but in the case of the vertical installation, the threshold value may be set to a large value (d=30 cm) regardless of the position of the person. This is because a distance between the camera and the person is small and a distance between the person and the background (the floor surface 42) is large.

Figure 8A:
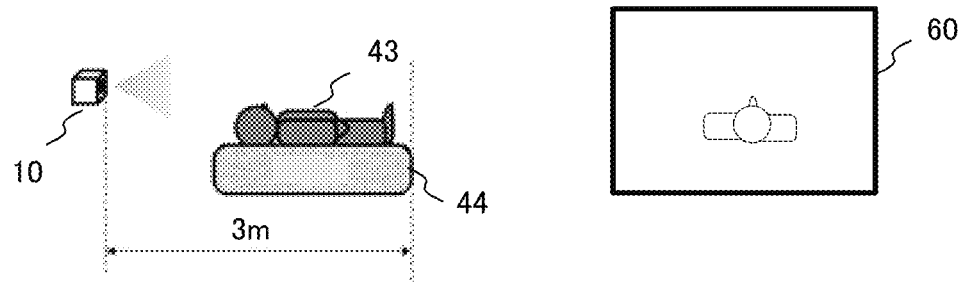
FIG. 8A is a diagram illustrating a relation between a posture of a person and a threshold value.
Figure 8B:
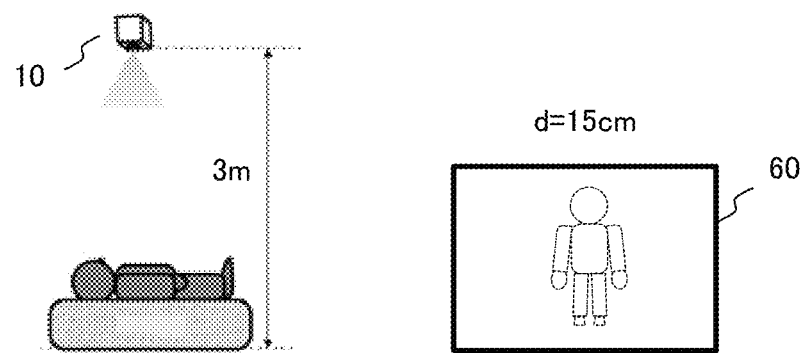
FIG. 8B is a diagram illustrating a relation between a posture of a person and a threshold value.
Figure 8C:
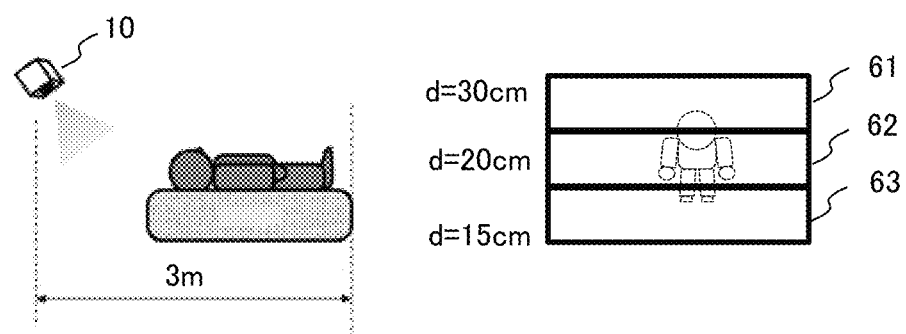
FIG. 8C is a diagram illustrating a relation between a posture of a person and a threshold value.

FIGS. 8A to 8C are diagrams illustrating a relation between the posture of the person and the threshold value. Here, a case of photographing a state in which the person 43 lies on a bed 44 by changing the installation angle of the camera is illustrated. The posture of the person, that is, a state in which the person stands (in an upright state) or lies (in a horizontal lying state) is detected by the installation angle detection unit 20 and the object distance/posture detection unit 21 of the camera. That is, the posture of the person is determined from a relation between the photographing direction of the camera and the person shape obtained by the distance calculation unit 13.

FIG. 8A illustrates a case of the camera A (the horizontal installation), where the photographed person shape is only the upper body. In this case, the threshold value for the entire screen 60 of the distance image is set to a large value (d=30 cm). This is because a distance between the camera and the person (the upper body) is small.

FIG. 8B illustrates a case of the camera B (the vertical installation), where the photographed person shape is a full body. The threshold value for the entire screen 60 is set to a small value (d=15 cm). This is because a distance between the camera and the person is large and a distance between the person and the background (the bed 44) is small.

FIG. 8C illustrates a case of the camera C (the inclined installation), where the screen 60 is divided in the vertical direction by a distance between the camera and the person and a different threshold value is set to each region. The upper region 61 of the screen has d=30 cm, the center region 62 has d=20 cm, and the lower region 63 has d=15 cm. The number of dividing the screen may be appropriately set in response to the composition of the subject. Here, two states, that is, the upright state and the horizontal lying state are adopted as the posture of the person, but other states (a state where the person sits on a chair) may be also included.

In the description above, a detailed example of setting the threshold value by using parameters including the installation angle of the camera, the distance to the object (the person), and the posture of the object (the person) has been described. Although there may be other combinations of the parameters, the threshold value may be determined in response to a distance between the camera and the person and a distance between the person and the background object in any case. The determined threshold value is stored in the lookup table (LUT) of the threshold value storage unit 22.

FIG. 9 is a diagram illustrating an example of the threshold value setting table stored by the threshold value storage unit 22. In the lookup table (LUT), the threshold value is optimally set by using the parameters including the installation angle θ of the camera, the posture of the person (the upright state/the horizontal lying state), and the distance s to the person. Further, when the installation angle of the camera is the inclined installation (θ=45°), the screen is divided into a plurality of regions and each region has the threshold value. The threshold value storage unit 22 refers to the lookup table, reads the threshold value d corresponding to the current parameter condition, and sets the threshold value in the process of the differentiator 17.

Figure 10:
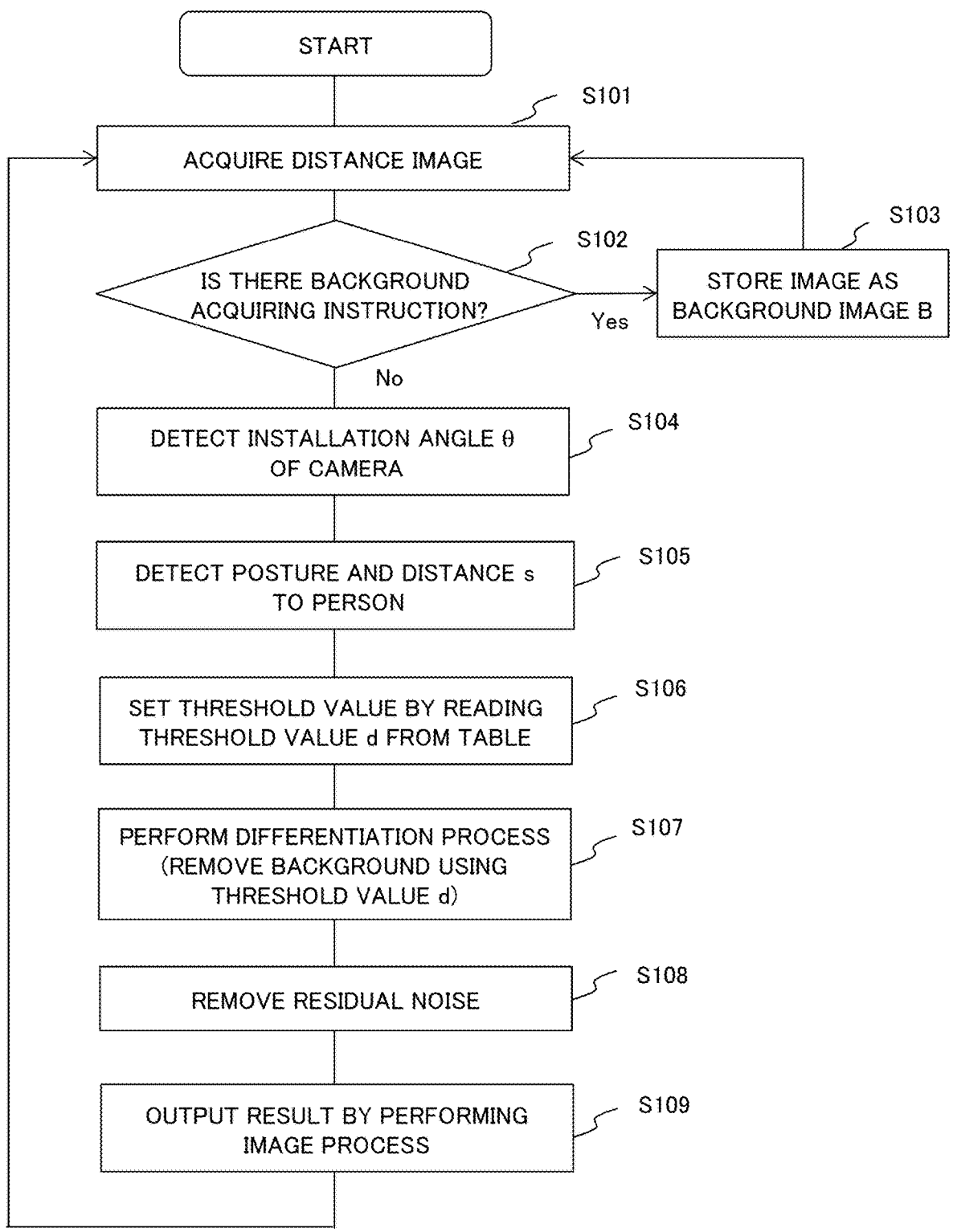
FIG. 10 is a flowchart illustrating a flow of an image process.

FIG. 10 is a flowchart illustrating a flow of an image process according to this embodiment. An image process below is performed in such a manner that the CPU of the object position detection apparatus controls the operation of each component of FIG. 1. Hereinafter, the flow of the step will be described.

S101: The distance image of the subject within a predetermined range is acquired by the distance image generation unit (the TOF camera) 10. That is, the distance calculation unit 13 calculates a distance to each part of the subject image and outputs a result as the distance image.

S102: The background image capturing unit 14 determines whether an instruction of capturing the background image is received. An instruction of capturing the background image may be performed by the operation of the user or may be automatically performed at a predetermined time. For example, when the movement of the customer in a shop is detected, the background image may be captured at a time before the shop opens. When there is a capturing instruction, the routine proceeds to S103. Meanwhile, when there is no instruction, the routine proceeds to S104.

S103: The background image storage unit 15 stores the current distance image as the background image B. Subsequently, returning to S101, the acquisition of the distance image is repeated.

S104: The installation angle detection unit 20 acquires the installation angle θ of the TOF camera 10.

S105: The object distance/posture detection unit 21 detects the distance s to the person from the distance data output from the distance calculation unit 13 and detects the posture of the person (the upright state/the horizontal lying state) from the shape of the person and the installation angle of the camera.

S106: On the basis of the condition of the posture of the person, the distance s of the person, and the installation angle θ detected in S104 and S105, the threshold value storage unit 22 refers to the lookup table (LUT) illustrated in FIG. 9, reads the corresponding threshold value d, and sets the threshold value in the differentiator 17.

S107: The differentiator 17 generates the difference image C from the distance data of the input image A of the distance calculation unit 13 and the background image B of the background image storage unit 15. That is, the background is removed by using the set threshold value d. Accordingly, when the input image A includes the person and the like, the difference image C has an image in which the person is extracted.

S108: The noise removal unit 18 performs a residual noise removing process on the difference image C to generate the object image (the person image E).

S109: The image process unit 19 performs a colorization process or the like on the object image (the person image E) on the basis of the distance data to output a result to the external device. Subsequently, returning to S101, the acquisition of the distance image is repeated.

Since the threshold value is adaptively set in response to the distance or the posture of the current person and the background is removed according to the above-described flow, a clear person image can be provided at all times even when the person moves.

In the above-described embodiment, a case of detecting the person as the subject has been described, but the same applies to a case where an object other than the person is detected. That is, when the threshold value for removing the background is set in accordance with the specific shape of the object, a clear object image can be obtained.

What is claimed is:

1. An object position detection apparatus which outputs a position of an object as a two-dimensional distance image, comprising:
   a distance image generation unit which generates the two-dimensional distance image by measuring a distance to a subject including the object on the basis of a light transmission time;
   an object image generation unit which generates an object image in which the object is extracted from the distance image of the subject; and
   an installation angle detection unit which detects an installation angle of the distance image generation unit or an object distance/posture detection unit which detects a distance to the object or a posture of the object,
   wherein the object image generation unit includes a differentiator performing a process of removing a background other than the object from the distance image of the subject, and
   wherein a threshold value for removing the background in the differentiator is set in response to the installation angle of the distance image generation unit detected by the installation angle detection unit or the detection result of the object distance/posture detection unit.

2. The object position detection apparatus according to claim 1,
   wherein the threshold value of the differentiator is set by the installation angle detected by the installation angle detection unit together with a combination of the distance to the object and the posture of the object detected by the object distance/posture detection unit.

3. The object position detection apparatus according to claim 2, further comprising:
   a threshold value storage unit which stores the threshold value in a lookup table by using parameters including the installation angle detected by the installation angle detection unit together with the distance to the object and the posture of the object detected by the object distance/posture detection unit,
   wherein the threshold value storage unit sets the threshold value of the differentiator by reading the corresponding threshold value from the lookup table.

4. The object position detection apparatus according to claim 3,
   wherein the threshold value is set to a larger value as the distance from the distance image generation unit to the object becomes smaller and the distance from the object to the background becomes larger.

5. The object position detection apparatus according to claim 1,
   wherein respective pixel values of the distance image indicate the distance from the distance image generation unit to the subject, and
   wherein the background removing process performed by the differentiator is a process of allowing a passage of the pixel values of the distance image in a region in which a distance difference with the background is larger than the threshold value and of replacing the pixel values with a predetermined value in a region in which the distance difference with the background is equal to or smaller than the threshold value.

6. An object position detection apparatus which outputs a position of an object as a distance image, comprising:
   a camera configured to generate a two-dimensional distance image by measuring respective distances to a subject including the object on the basis of a light transmission time;
   an installation angle sensor configured to detect an installation angle of the camera;
   a processor programmed to select a threshold value based at least on the detected installation angle, remove a background other than the object from the distance image according to the selected threshold value, and generate an object image in which the object is extracted from the distance image.

7. The object position detection apparatus according to claim 6, wherein the processor is further programmed to detect a distance from the camera to the object, and select the threshold value based at least on the detected installation angle and the detected distance.

8. The object position detection apparatus according to claim 6, wherein the processor is further programmed to detect a posture of the object, and select the threshold value based at least on the detected installation angle and the detected posture.

9. The object position detection apparatus according to claim 6, wherein the processor is further programmed to detect a distance from the camera to the object, detect a posture of the object, and select the threshold value based on a combination of the detected installation angle, the detected distance and the detected distance.

10. The object position detection apparatus according to claim 6, wherein the processor is further programmed to select the threshold value from a lookup table in which a plurality of predetermined threshold values are stored in correspondence with a plurality of combinations of installation angles, distance ranges to the object, and postures of the object.

11. The object position detection apparatus according to claim 10,
    wherein the predetermined threshold values are set to increase as the distance ranges decrease.

12. The object position detection apparatus according to claim 6,
 wherein respective pixel values of the distance image indicate the distance from the camera to the subject, and
 wherein the removal of the background other than the object from the distance image is a process of allowing a passage of the pixel values of the distance image in a region in which a distance difference with the background is larger than the selected threshold value and of replacing the pixel values with a predetermined value in a region in which the distance difference with the background is equal to or smaller than the selected threshold value.

* * * * *